(12) United States Patent
Riedl et al.

(10) Patent No.: US 8,431,196 B2
(45) Date of Patent: Apr. 30, 2013

(54) METHOD FOR FIXING THE POSITION OF A GLASS TUBE OR GLASS ROD SPIRAL IN A GLASS TUBE, GLASS TUBE ASSEMBLY AND THE APPLICATION OF THE SAME

(75) Inventors: Markus Riedl, Mitterteich (DE); Reiner Bartsch, Tischenreuth (DE); Franz Voelkl, Friedenfels (DE); Franz Jaeger, Tischenreuth (DE); Karola Schneider, Maehring (DE)

(73) Assignee: Schott AG, Mainz (DE)

( * ) Notice: Subject to any disclaimer, the term of this patent is extended or adjusted under 35 U.S.C. 154(b) by 826 days.

(21) Appl. No.: 12/488,730

(22) Filed: Jun. 22, 2009

(65) Prior Publication Data

US 2009/0324860 A1     Dec. 31, 2009

(30) Foreign Application Priority Data

Jun. 25, 2008   (DE) .......................... 10 2008 029 759

(51) Int. Cl.
*B32B 1/08*         (2006.01)
*B32B 23/00*        (2006.01)

(52) U.S. Cl.
USPC ....... 428/34.4; 428/34.1; 428/34.2; 428/35.7; 428/35.9; 428/36.9

(58) Field of Classification Search ................. 428/34.1, 428/34.2, 35.7, 35.9, 36.9, 34.4
See application file for complete search history.

(56) References Cited

U.S. PATENT DOCUMENTS

| | | | | |
|---|---|---|---|---|
| 2,119,009 A | * | 5/1938 | Elias | 138/148 |
| 3,837,830 A | * | 9/1974 | Eberhart | 65/54 |
| 4,333,523 A | * | 6/1982 | Hartzler | 165/73 |
| 5,639,288 A | | 6/1997 | Schoubye | 65/55 |
| 6,340,414 B1 | | 1/2002 | Hommeltoft | 203/49 |

FOREIGN PATENT DOCUMENTS

EP          0 687 658     12/1995

* cited by examiner

*Primary Examiner* — Marc Patterson
(74) *Attorney, Agent, or Firm* — Michael J. Striker

(57) ABSTRACT

The glass tube assembly has an outer glass tube provided with a tapered section and an inner glass tube or rod, which is arranged inside of the outer glass tube and which has a spiral section. The tapered section is formed by one or more projections on the inner surface of the outer glass tube. Each projection extends in a longitudinal direction of the outer glass tube and does not extend around its entire circumference. The internal width of the tapered section is smaller than the outside diameter of the spiral section of the inner glass tube or rod, so that the inner glass tube or rod is reliably prevented from slipping or rotating out of the outer glass tube by its spiral section. A method of making the glass tube assembly is also described.

25 Claims, 4 Drawing Sheets

Figure 1:
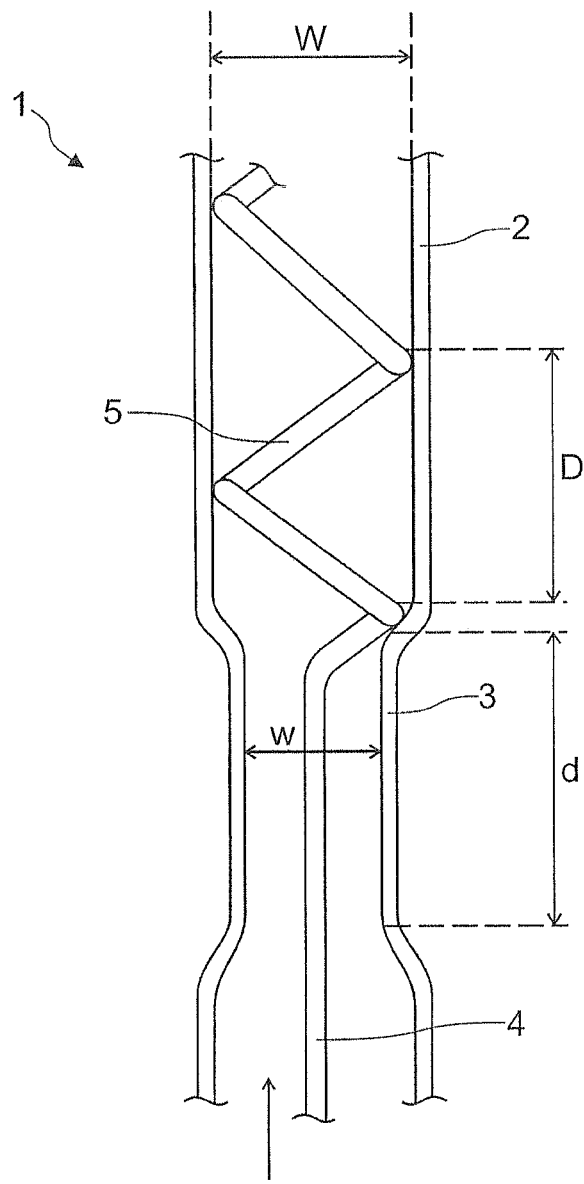

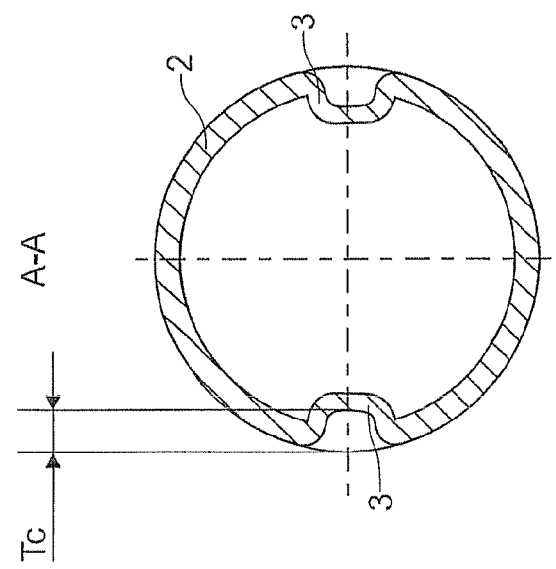
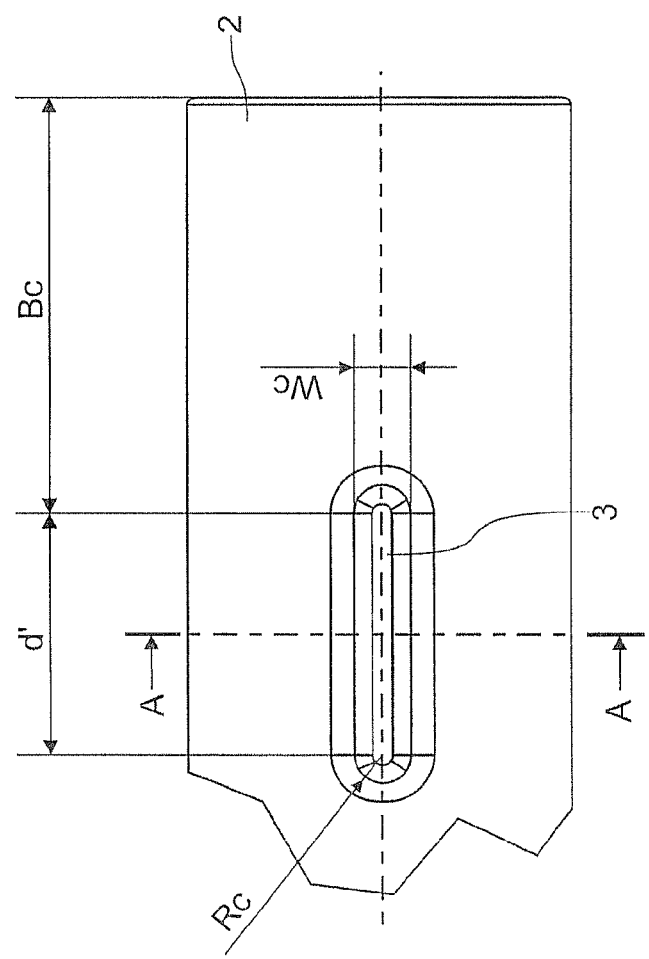
Fig. 2b
Fig. 2a

METHOD FOR FIXING THE POSITION OF A GLASS TUBE OR GLASS ROD SPIRAL IN A GLASS TUBE, GLASS TUBE ASSEMBLY AND THE APPLICATION OF THE SAME

CROSS-REFERENCE

The present application claims the priority of German patent application no. 10 2008 029 759.3-45 "Method for fixing the location of a glass tube or glass rod spiral in a glass tube, glass tube assembly and the application of the same", filed on Jun. 25, 2008 and granted as a German patent, the entire content being hereby expressly incorporated by way of reference.

FIELD OF THE INVENTION

The present invention relates in general to the location of a glass tube or glass rod spiral within a glass tube, with applications in, for instance, heat exchangers or for processing a gas stream, for example for the desulphurisation of flue gases in a cross-flow heat exchanger.

BACKGROUND OF THE INVENTION

Glass tube assemblies as described in the present application in which a glass tube or glass rod spiral is mounted inside a glass tube, are used in many various forms in heat exchangers and in the process treatment of gas flows, for example in the recovery of strong acids, such as sulphuric acid, as described, for instance in the European patent application EP 0 687 658 A1 or in the U.S. Pat. No. 6,340,414 B1, the content of which is hereby expressly included by way of reference, in so far as this concerns potential applications of the invention claimed.

It is often necessary to cool down hot acidic gas flows in the end stage of such a process. This is done using a condenser assembly comprising a jacket tube and a spiral tube arranged inside the jacket tube. The spiral offers a large surface area and simultaneously ensures swirl mixing of the gas flowing through the jacket tube. This is used to condense out acid compounds or inorganic acids which are then recovered. The condensed acid compounds or acids, which condense onto the spiral tube, flow down inside the jacket tube following gravity and are collected in a collecting container.

U.S. Pat. No. 5,639,288 discloses a method for fixing the spiral tube in the jacket tube in which a thin glass tube is introduced into the jacket tube with a greater internal diameter via a guide tube mounted on the inside of the jacket tube. The guide tube is located in a heated area within the jacket tube in which the inserted glass tube is heated to its softening temperature. The guide tube has a curved outlet, so that glass tube continuously introduced into the guide tube and the heated zone is deformed into a spiral. Rotating the jacket tube causes the glass tube, which is given a spiral form in this way, to attach itself in a spiral form to the inner face of the jacket tube. Because the glass tube is heated to its softening point, a material bond is created between the jacket tube and the glass tube spiral.

It is indeed true that the location of the glass tube spiral can be reliably fixed by this method. A simple location of the glass tube spiral against axial longitudinal displacement in only one direction would, however, be sufficient for applications of the type described above in which the jacket tube is usually arranged vertically. The method overall is comparatively complex and does not permit reworking in the event of irregular arrangement of the glass tube spiral or other deviations from the desired configuration.

A circumferential taper at the lower end of the outer may also be used to secure the glass tube spiral against axial longitudinal displacement in a glass tube, although this has the undesirable effect of impairing the gas flow and the drainage of the condensate into the collecting container.

Alternatively, the use of stainless steel spiral tubes which are suspended in the vertically arranged outer glass tube is known from the prior art. However, when highly acid gas flows are being treated, the stainless steel and the material suspending the stainless steel spiral corrodes, considerably reducing the efficiency of treatment of the gas flow.

SUMMARY OF THE INVENTION

It is an object of the present invention to provide a method and a glass tube assembly whereby the location of a glass tube or glass rod spiral can reliably be fixed in an external glass tube in a simple and cost-effective manner. A further aspect of the present invention concerns preferred applications of a glass tube assembly of this kind.

Thus the present invention is based on a method for fixing the location of a glass tube or glass rod spiral in a glass tube, wherein the glass tube or glass rod spiral comprises a spiral-shaped glass tube or glass rod section with a specified external diameter W and the glass tube has an internal diameter that is greater than the outside diameter W of the spiral glass tube or glass rod section. According to the invention, the glass tube is provided on its inner surface with at least one projection that is not completely circumferentially formed, i.e. does not extend around the full circumference of the glass tube, so that a tapered glass tube section with an internal width w is formed that is smaller than the specified outside diameter W of the glass tube or glass rod spiral.

The glass tube or glass rod spiral unintentionally slipping or rotating out through the tapered glass tube section is reliably prevented by the dimensions of the glass tube assembly selected. Tapered glass tube sections of this kind may be formed simply and cost-effectively as is described in greater detail below. Since according to the invention the at least one projection does not extend over the entire internal circumference and quite particularly preferably only over a comparatively small portion of the internal circumference of the outer glass tube, the flow behavior of a gas flow to be treated in the outer glass tube will only be affected to a minor degree according to the invention. Furthermore, the condensates can be directed past the projection concerned essentially unimpeded into a downstream collecting container.

According to a further embodiment, the total length of the tapered section of glass tube in the longitudinal direction of the glass tube is at least as great as the pitch of the glass tube or glass rod spiral. This feature means that the glass tube or glass rod spiral can reliably be prevented from being rotated out of the outer glass tube.

According to a further embodiment, the projection extends in the longitudinal direction of the glass tube even if, according to the invention, versions of the projection are fundamentally possible at an angle to the longitudinal direction of the glass tube, bending, curved or in a spiral, as long as the glass tube or glass rod spiral is reliably prevented from unintentionally slipping through the tapered section of the glass tube.

According to a preferred embodiment, a plurality of projections is formed on the inner surface of the outer glass tube, which may more particularly be arranged at regular angular distances from one another. In a more particularly preferred design, two projections are formed diametrically opposite one another on the inner surface of the glass tube.

According to a further embodiment, at least two projections are formed which do not extend along the entire circumference and which are arranged offset from one another in the longitudinal direction of the glass tube. The projections can be aligned in the longitudinal direction of the glass tube, but may also however be arranged staggered against one another in the circumferential direction of the glass tube, i.e. perpendicular to the longitudinal direction of the glass tube. In an embodiment of this kind, the spiral glass tube or glass rod section is prevented from slipping or rotating unintentionally out of the glass tube by the length of the projections being smaller than the pitch of the glass tube or glass rod spiral and the projections being offset against one another in the longitudinal direction of the glass tube by a distance that is not equal to the pitch of the glass tube or glass rod spiral.

Any method in which an effective reduction in the cross section of the outer glass tube is achieved is basically conceivable for forming the appropriate projections. According to a first embodiment, each projection is formed by heating the glass tube while said tube is rotated around its longitudinal axis to a temperature at which the material of the outer glass tube can be deformed, by impressing a longitudinal depression from the outside using a forming tool and by subsequent controlled cooling of the deformed glass tube section. The purpose of controlled cooling is to reduce stresses in the deformed area.

According to an alternative embodiment, each projection is formed by heating the glass tube while said tube is being rotated around its longitudinal axis and by blowing the glass tube into a two or more part heat-resistant die, which preferably consists of graphite and encloses the glass tube during the forming operation. The forming process can be supported here by pressing the die and or by applying air under pressure or a vacuum. When the outer glass tube is blown into the die referred to above, the latter is heated locally so that the tube is deformable to the extent desired, with ductilities in the range from $10^3$ to $10^7$ being preferred.

According to a further alternative embodiment, the projection concerned may also be formed by fusing an oblong piece of glass onto the inner surface of the glass tube.

In any event, the outer glass tube will be of adequate strength if the thinnest wall thickness in the region of the deformed area is no less than 0.4 times the nominal wall thickness of the outer glass tube. The total width of the projections here, more particularly the deformed regions, in the circumferential direction amounts to less than 50% of the inner circumference of the glass tube.

A further aspect of the present invention thus concerns a glass tube assembly manufactured in accordance with the method described above, more particularly for applications in heat exchangers or for the treatment of gases flowing through the outer glass tube. The glass tube or glass rod spirals are provided to increase the performance of the condensers, that is to increase the heat exchanger surface and to swirl mix the gas flow. The liquids contained in the medium flowing through the outer glass tube condense on the glass tube or glass rod spirals and flow along these and the inner wall of the glass tube down against the direction of flow of the gas flow into a collecting container.

Fixing according to the invention creates a comparatively slight narrowing of the cross section of the outer glass tube and hence the flow rate and drag are less severely affected. This allows higher throughput rates and higher performance with the same amount of piping in the condenser.

OVERVIEW OF THE FIGURES

Figure 2C:
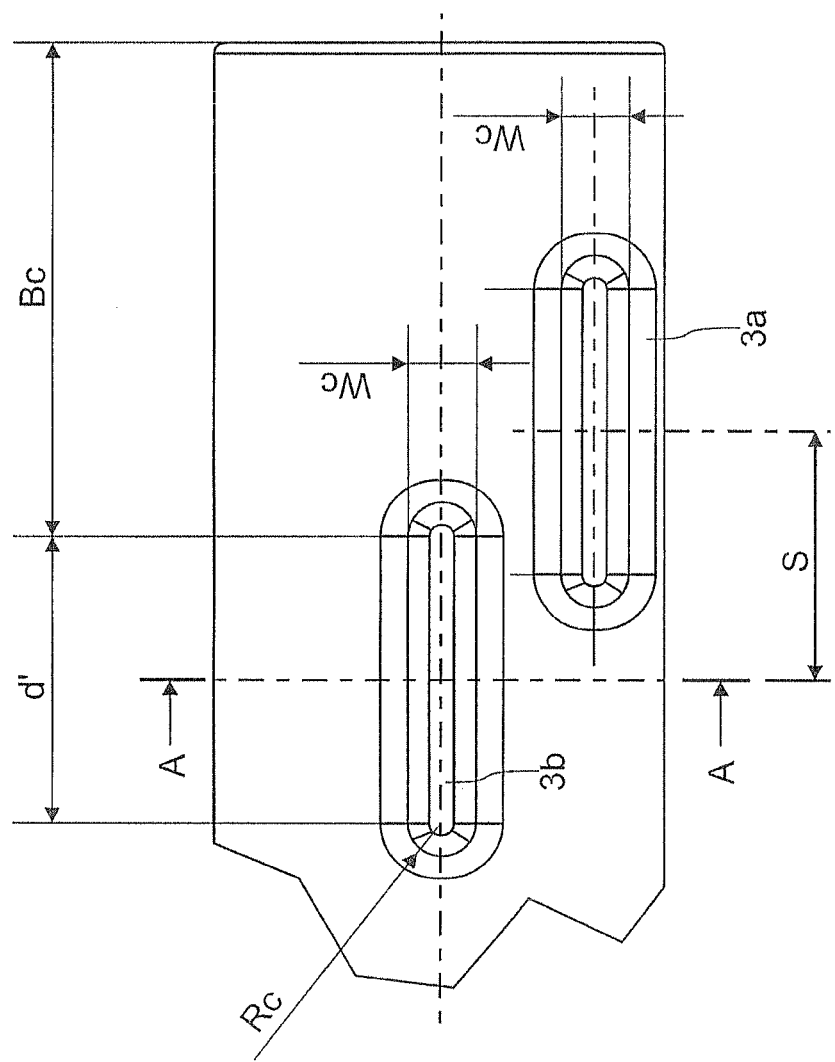
Figure 2D:
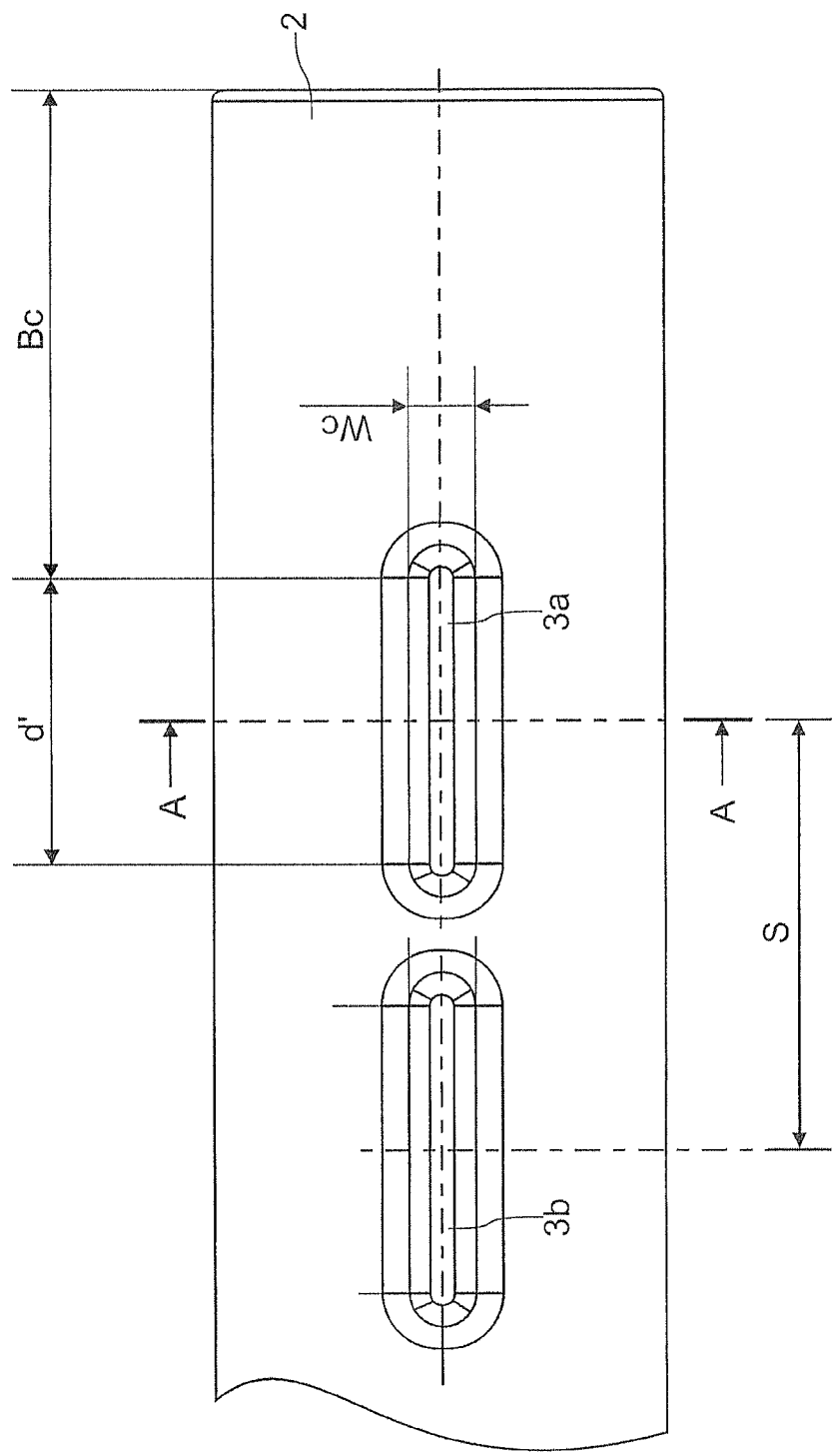

The invention will be described below on the basis of examples and with reference to the attached drawings from which further benefits, features and problems to be solved will become apparent to a person skilled in the art. The drawings show:

FIG. 1 a glass tube assembly in accordance with the present invention in a schematic cross-sectional representation;

FIG. 2a a tapered section of glass tube formed by the method according to the invention in the glass tube assembly according to FIG. 1 in a schematic side view and partial section;

FIG. 2b a cross section along the line A-A according to FIG. 2a;

FIG. 2c a diagrammatic partial side view of the tapered section of glass tube in the glass tube assembly according to a further embodiment of the present invention; and FIG. 2d a diagrammatic partial side view of the tapered section of glass tube in the glass tube assembly according to a further embodiment of the present invention.

The same reference signs in the figures are used to identify the same elements or element groups or those having essentially the same effect.

COMPREHENSIVE DESCRIPTION OF A PREFERRED EMBODIMENT

According to FIG. 1, a glass tube spiral 5 which develops into a straight section 4 is arranged in the vertically extending outer glass tube 2. The length of this straight section can also be negligible. In a region of the outer glass tube 2, preferably near the vertically lower end of the same, a tapered glass tube section 3 is formed which, in the embodiment illustrated, comprises two longitudinal depressions 3 diametrically opposed to one another and extending in the longitudinal direction of the glass tube 2, that together determine a minimum internal width w that is smaller than the maximum outside dimension W of the glass tube spiral 5. To prevent the glass tube spiral 5 rotating out of the outer glass tube 2, the length d of the tapered glass tube section in the longitudinal direction of the glass tube 2 is greater than the pitch D of the glass tube spiral 5. Instead of the glass tube spiral 5 illustrated, a spiral formed from a glass rod can, self-evidently, also be fitted in the outer glass tube 2.

In the case of the specified applications in heat exchangers or for process treatment of gases such as are described in U.S. Pat. No. 5,639,288, European patent application EP 0 687 658 A1 or the U.S. Pat. No. 6,340,414 B1, a gas stream flows through the outer glass tube, with the direction of flow being indicated diagrammatically by the arrow in FIG. 1. Condensate deposits on the surface of the glass tube spiral 5 and flows along the glass tube spiral 5 and on the inner wall of the outer glass tube 2 vertically downwards to be collected in a container arranged beneath the glass tube assembly 1.

The longitudinal depressions 3 according to FIG. 1 can be formed by heating the outer glass tube 2 while this is rotating around its longitudinal axis and by pressing from the outside with a correspondingly shaped forming tool and by subsequent controlled cooling of the deformed section of the glass tube. Alternatively, a longitudinal depression of this kind may also be formed following appropriate warming by blowing the outer glass tube 2 into a two or more part heat-resistant die, which more particularly may consist of graphite and which encloses the glass tube during the forming operation. Alternatively, internal projections of this kind may also be formed by fusing oblong glass pieces, for instance glass rods, onto the tube.

According to FIG. 2a, the longitudinal depression 3 is formed with mirror symmetry and with rounded end regions. The longitudinal depression 3 extends in the longitudinal direction of the outer glass tube 2. The width Wc of longitudinal depression 3 may be a few millimetres, the total length w of the longitudinal depression 3 is coordinated with the pitch D of the glass tube spiral 5 (cf. FIG. 1) and is preferably greater than the latter.

FIG. 2b illustrates the cross-sectional form of the longitudinal depressions 3. These have an essentially flat base and take the overall form of a trough with sidewalls extending radially inwards which transition through rounded formed areas into the base or the outer wall of the glass tube. According to FIG. 2b the deformation is made so great here that the depth Tc of the trough-shaped longitudinal depression 3 is greater than the nominal wall thickness of the outer glass tube 2. Care must be taken to ensure that the thinnest wall thickness in the area of the longitudinal depression 3 is not less than 0.4 times the nominal wall thickness of the outer glass tube 2 to ensure adequate strength.

FIG. 2c shows a partial side view of the tapered section of glass tube of the glass tube assembly according to a further embodiment of the present invention. According to FIG. 2c, two longitudinal depressions 3a, 3b with identical profiles are formed in the tapered section of glass tube. The longitudinal depressions 3a, 3b are offset against one another in the longitudinal direction of the glass tube by a distance s that is not equal to the pitch of the spiral section of glass tube or glass rod, itself not illustrated. In this way, the spiral-shaped glass tube or glass rod section and hence the glass tube or glass rod spiral that is to be fixed in location can be reliably prevented from rotating itself out. The longitudinal depressions 3a, 3b are also offset against one another in the circumferential direction, i.e. perpendicular to the longitudinal direction of the glass tube.

FIG. 2d shows in a partial side view the tapered glass tube section of a modification of the glass tube assembly according to FIG. 2d, in which the longitudinal depressions 3a, 3b are aligned in the longitudinal direction of the glass tube 2, but are otherwise formed as described above using FIG. 2c.

Borosilicate glasses are preferably used for the manufacture of the glass tube assembly, as these have a very high resistance to chemical aggression. Self-evidently, tapered glass tube sections as described above can also be arranged in the outer glass tube above and below the spiral-shaped glass tube or glass rod section in order to secure the glass spiral against longitudinal displacement in two opposed directions.

LIST OF REFERENCE NUMBERS

1 Glass tube assembly
2 Glass tube/jacket tube
3 Longitudinal depression/tapered section of glass tube
3a Longitudinal depression
3b Longitudinal depression
4 Thin glass tube
5 Glass spiral
$W_c$ Internal width of longitudinal depression 3
$R_c$ Radius of curvature of longitudinal depression 3
$B_c$ Distance between a longitudinal depression and the end of the glass tube 2
$T_c$ Depth of longitudinal depression 3
d Length of longitudinal depression 3
S Spacing between two longitudinal depressions

What is claimed is:

1. A glass tube assembly comprising
an outer glass tube; and
an inner glass member selected from the group consisting of a glass tube and a glass rod, said inner glass member comprising a spiral section;
wherein said inner glass member is arranged inside said outer glass tube; and
wherein said outer glass tube has at least one projection extending radially inwards from an inner surface of said outer glass tube, said at least one projection does not extend around an entire circumference of said outer glass tube and said at least one projection forms a tapered section of said outer glass tube, wherein said tapered section of said outer glass tube has an internal width (w) that is smaller than an outside diameter (W) of said spiral section, and said at least one projection and said spiral section are dimensioned,
so that said inner glass member is prevented from slipping or rotating through said tapered section and out of said outer glass tube.

2. The glass tube assembly as claimed in claim 1, wherein the outer glass tube extends in a longitudinal direction and each of said at least one projection extends in said longitudinal direction of said outer glass tube.

3. The glass tube assembly as claimed in claim 2, wherein said at least one projection comprises two projections formed opposite each other on said inner surface of said outer glass tube.

4. The glass tube assembly as claimed in claim 1, wherein said outer glass tube extends in a longitudinal direction and said at least one projection comprises two projections arranged offset from one another in said longitudinal direction of said outer glass tube.

5. The glass tube assembly as claimed in claim 4, wherein said two projections are aligned in said longitudinal direction of said outer glass tube or are offset from one another in a circumferential direction perpendicular to said longitudinal direction of said outer glass tube.

6. The glass tube assembly as claimed in claim 4, wherein said two projections have a respective length (d') that is smaller than a pitch (D) of said spiral section of said inner glass member and said two projections are offset against one another in said longitudinal direction of said outer glass tube by a distance (S) that is not equal to said pitch (D) of said spiral section of said inner glass member.

7. The glass tube assembly as claimed in claim 1, wherein said spiral section of said inner glass member has a pitch (D), said tapered section of said outer glass tube has a total length (d), and said total length (d) is at least as great as said pitch (D), so that slipping or rotation of said inner glass member out of the outer glass tube is reliably prevented.

8. The glass tube assembly as claimed in claim 1, wherein said outer glass tube comprises a tube wall and each of said at least one projection is formed by a longitudinal depression in said tube wall.

9. The glass tube assembly as claimed in claim 1, wherein each of said at least one projection is a glass piece fused onto said inner surface of said outer glass tube.

10. The glass tube assembly as claimed in claim 1, wherein said outer glass tube has a tube wall with a nominal wall thickness and a thinnest wall portion of said tube wall in the vicinity of said at least one projection has a thickness that is no less than 0.4 times said nominal wall thickness of said tube wall.

11. The glass tube assembly as claimed in claim 1, wherein said at least one projection on said inner surface of said outer glass tube has a total width that is less than 50% of an inner circumference of said outer glass tube.

12. A method of making a glass tube assembly, said glass tube assembly comprising an outer glass tube and an inner glass member, wherein said inner glass member is selected from the group consisting of a glass tube and a glass rod and said inner glass member includes a spiral section;

wherein said method comprises the steps of:
a) forming at least one projection on an inner surface of said outer glass tube so that said at least one projection extends radially inwards from said inner surface of said outer glass tube and forms a tapered section of said outer glass tube, said at least one projection does not extend around an entire circumference of said outer glass tube and said tapered section has an internal width (w) that is smaller than an outside diameter (W) of said spiral section; and
b) arranging said inner glass member inside of said outer glass tube;
wherein said at least one projection and said spiral section of said inner glass member are dimensioned so that said inner glass member is prevented from slipping or rotating through said tapered section and out of said outer glass tube.

13. The method as claimed in claim 12, wherein during said forming each of said at least one projection is formed so as to extend in a longitudinal direction of said outer glass tube.

14. The method as claimed in claim 12, wherein during said forming two diametrically opposed projections are formed in order to form said tapered section of said outer glass tube.

15. The method as claimed in claim 12, wherein during said forming said at least one projection is formed on said inner surface of said outer glass tube, so that said tapered section has a total length (d) that is at least as great as a pitch (D) of said spiral section, 16. The method as claimed in claim 12, wherein during said forming two projections are offset from one another in a longitudinal direction of said outer glass tube.

17. The method as claimed in claim 16, wherein said two projections are aligned in said longitudinal direction or are offset from one another in a circumferential direction perpendicular to said longitudinal direction of said outer glass tube.

18. The method as claimed in claim 17, wherein a respective length (d') of said two projections is smaller than a pitch (D) of said spiral section and said two projections are offset against one another in said longitudinal direction by a distance (s) that is not equal to said pitch (D) of said spiral section.

19. The method as claimed in claim 12, wherein said forming of each of said at least one projection comprises heating said outer glass tube while said outer glass tube is rotating around a longitudinal axis thereof, pressing a longitudinal depression into said outer glass tube from an exterior thereof using a forming tool and subsequent controlled cooling of a deformed section of said outer glass tube, said deformed section including said longitudinal depression.

20. The method as claimed in claim 12, wherein said forming of each of said at least one projection comprises heating said outer glass tube while said outer glass tube is rotating around a longitudinal axis thereof and blowing said outer glass tube in a two-or-more-part heat-resistant die.

21. The method as claimed in claim 20, wherein said die consists of graphite and encloses said outer glass tube during said forming.

22. The method as claimed in claim 20, wherein during said forming said die is placed under pressure and/or is assisted by applying air under pressure or a vacuum.

23. The method as claimed in claim 12, wherein said forming comprises fusing a piece of glass onto said inner surface of said outer glass tube.

24. The method as claimed in claim 12, wherein during said forming said at least one projection is formed so that a smallest wall thickness in the vicinity of said at least one projection is not smaller than 0.4 times a nominal wall thickness of said outer glass tube.

25. The method as claimed in claim 12, wherein during said forming said at least one projection is formed so that a total width of said at least one projection on said inner surface of said outer glass tube is less than 50% of an inner circumference of said outer glass tube.

* * * * *